US009233360B1

(12) United States Patent
Jothimurugesan et al.

(10) Patent No.: US 9,233,360 B1
(45) Date of Patent: Jan. 12, 2016

(54) STABLE SUPPORT FOR FISCHER-TROPSCH CATALYST

(71) Applicants: Kandaswamy Jothimurugesan, Hercules, CA (US); Mark Muraoka, Walnut Creek, CA (US)

(72) Inventors: Kandaswamy Jothimurugesan, Hercules, CA (US); Mark Muraoka, Walnut Creek, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 14/482,313

(22) Filed: Sep. 10, 2014

(51) Int. Cl.
| B01J 21/04 | (2006.01) |
| B01J 23/75 | (2006.01) |
| B01J 23/70 | (2006.01) |
| B01J 27/185 | (2006.01) |
| B01J 23/89 | (2006.01) |
| B01J 37/02 | (2006.01) |
| B01J 37/08 | (2006.01) |

(Continued)

(52) U.S. Cl.
CPC ............... *B01J 27/1856* (2013.01); *B01J 21/04* (2013.01); *B01J 23/75* (2013.01); *B01J 23/898* (2013.01); *B01J 23/8993* (2013.01); *B01J 37/024* (2013.01); *B01J 37/0205* (2013.01); *B01J 37/0207* (2013.01); *B01J 37/08* (2013.01); *B01J 37/18* (2013.01); *C10G 2/333* (2013.01); *B01J 23/70* (2013.01)

(58) Field of Classification Search
CPC .................................. B01J 23/70; B01J 23/75
See application file for complete search history.

(56) References Cited

U.S. PATENT DOCUMENTS

| 5,756,419 | A | 5/1998 | Chaumette et al. | |
| 6,638,889 | B1 * | 10/2003 | Van Berge et al. | ............ 502/300 |
| 7,012,104 | B2 | 3/2006 | Espinoza et al. | |
| 7,402,612 | B2 | 7/2008 | Jin et al. | |

(Continued)

FOREIGN PATENT DOCUMENTS

| WO | WO99/42214 | 8/1999 |
| WO | WO02/07883 A2 | 1/2002 |

(Continued)

OTHER PUBLICATIONS

Madikizela-Mnqangeni et al., "The preparation and study of sol-gel synthesized Co/Zn/TiO$_2$ Fischer-Tropsch catalysts" ScienceDirect, Applied Catalysis A: General 317 (2007), p. 195-203.

(Continued)

*Primary Examiner* — Jafar Parsa
*Assistant Examiner* — Medhanit Bahta
(74) *Attorney, Agent, or Firm* — Karen R. DiDomenicis

(57) ABSTRACT

A process has been developed for preparing a Fischer-Tropsch catalyst precursor and a Fischer-Tropsch catalyst made from the precursor. The process includes contacting a gamma alumina catalyst support material with a first solution containing a compound containing zinc and optionally containing P, Ti, V, Co, Ga, Ge, Mo, W and/or Pr to obtain a modified catalyst support material. The modified catalyst support material is calcined at a temperature of at least 500° C. The calcined modified catalyst support has a pore volume of at least 0.4 cc/g. The modified catalyst support is less soluble in acid solutions than an equivalent unmodified catalyst support. The modified catalyst support is contacted with a second solution which includes a precursor compound of an active cobalt catalyst component to obtain a catalyst precursor. The catalyst precursor is reduced to activate the catalyst precursor to obtain the Fischer-Tropsch catalyst. The catalyst has enhanced hydrothermal stability as measured by losing no more than 20% of its pore volume when exposed to water vapor.

14 Claims, 2 Drawing Sheets

(51) Int. Cl.
*B01J 37/18* (2006.01)
*C10G 2/00* (2006.01)

(56) References Cited

U.S. PATENT DOCUMENTS

| | | | |
|---|---|---|---|
| 7,449,496 B2 * | 11/2008 | Jin et al. ........................ | 518/700 |
| 2005/0245623 A1 | 11/2005 | Van Berge et al. | |
| 2009/0325786 A1 * | 12/2009 | Liu ......................... | B01J 29/80 |
| | | | 502/73 |
| 2011/0021646 A1 | 1/2011 | Baijense | |

FOREIGN PATENT DOCUMENTS

| | | |
|---|---|---|
| WO | WO03/012008 A2 | 2/2003 |
| WO | WO2013/088290 A1 | 6/2013 |

OTHER PUBLICATIONS

Madikizela-Mnqangeni et al., "Surface and reactor study of the effect of Zinc on titania-supported Fischer-Tropsch cobalt catalysts" ScienceDirect, Applied Catalysis A: General 272 (2004), p. 339-346.

* cited by examiner

STABLE SUPPORT FOR FISCHER-TROPSCH CATALYST

FIELD

The present disclosure relates generally to catalysts for use in Fischer-Tropsch processes in which synthesis gas is converted to hydrocarbon products.

BACKGROUND

Supported cobalt catalysts are commonly used in the Fischer-Tropsch synthesis (FTS) step in gas-to-liquid (GTL) processes due to their high activity and selectivity to heavy hydrocarbons. The performance of the cobalt catalysts is very important for the economics of the GTL process. The FTS process is typically performed in a three-phase slurry reactor. An important advantage of the slurry reactor over fixed bed reactors is the greatly improved heat removal capability and ease of temperature control.

Alumina is one of the most desirable catalyst supports. Due to its high surface area and good mechanical properties, the gamma form of alumina has been used widely in industry for many catalytic applications. However, in an acidic or alcohol containing reaction medium such as Fischer-Tropsch synthesis conditions to produce wax, or other reactions proceeding in aqueous medium such as alcohol, ether, and ester syntheses, an alumina support exhibits a stability problem. Alumina may dissolve or leach slowly in the reactor due to attacks of acid and alcohol byproducts in the reaction medium. Dissolution of alumina support in acid medium is detrimental in catalyst stability. The dissolution of the support may cause poor catalyst integrity and possible fines generation. Fines generation will hurt the subsequent filtration and post processing operations. High metal or metal compound content in a Fischer-Tropsch product is undesirable because such contaminants could have adverse effects for the Fischer-Tropsch process, such as causing reactor plugging or significantly reducing catalyst life. As a result, it is important that the product of the Fischer-Tropsch process be free of metal and other contaminants that could adversely affect its subsequent processing. Thus it is highly desirable to have an alumina catalyst support with much improved acid resistance.

The churning of the contents of the three-phase slurry reactor exerts a significant mechanical stress on the suspended catalysts, placing a high premium on their mechanical integrity to avoid attrition of the catalyst particles in the slurry. By attrition is meant physical breakdown of the catalyst particles caused by friction or grinding as a result of impact with other particles. The cobalt catalyst in the FTS slurry is additionally susceptible to hydrothermal attack that is inherent to the FTS process at conventional slurry conditions because of the presence of water at high temperatures. Such hydrothermal attack is particularly a factor on exposed and unprotected catalyst support material, resulting in weaker support material such that the catalyst is more susceptible to attrition. Such catalyst attrition can result in contamination of the produced heavy hydrocarbons (i.e., wax) with fines.

It would be desirable to have a cobalt Fischer-Tropsch catalyst having improved stability for use in slurry reactors.

SUMMARY

In one aspect, a process is provided for preparing a Fischer-Tropsch catalyst precursor. The process includes contacting a gamma alumina catalyst support material with a first solution containing a compound containing zinc and optionally containing P, Ti, V, Co, Ga, Ge, Mo, W and/or Pr to obtain a catalyst support material. The catalyst support material is calcined at a temperature of at least 500° C. to obtain a modified catalyst support having a pore volume of at least 0.4 cc/g. The modified catalyst support is less soluble in acid aqueous solutions than an equivalent unmodified catalyst support. The modified catalyst support loses no more than 15% of its pore volume when exposed to water vapor. The modified catalyst support is contacted with a second solution which includes a precursor compound of an active catalyst component to obtain a catalyst precursor.

In another aspect, a process is provided for preparing a Fischer-Tropsch catalyst. The catalyst precursor is prepared as described above, and the catalyst precursor is reduced to activate the catalyst precursor to obtain the Fischer-Tropsch catalyst. The catalyst has enhanced hydrothermal stability as measured by losing loses no more than 20% of its pore volume when exposed to water vapor.

In another aspect, a process is provided for Fischer-Tropsch synthesis including contacting a gaseous mixture comprising carbon monoxide and hydrogen with the Fischer-Tropsch catalyst prepared as described above at a pressure of from 0.1 to 3 MPa and a temperature of from 180 to 260° C. A product comprising $C_{5+}$ hydrocarbons is produced.

DESCRIPTION OF THE DRAWINGS

These and other objects, features and advantages of the present invention will become better understood with reference to the following description, appended claims and accompanying drawings where:

DETAILED DESCRIPTION

Figure 1:
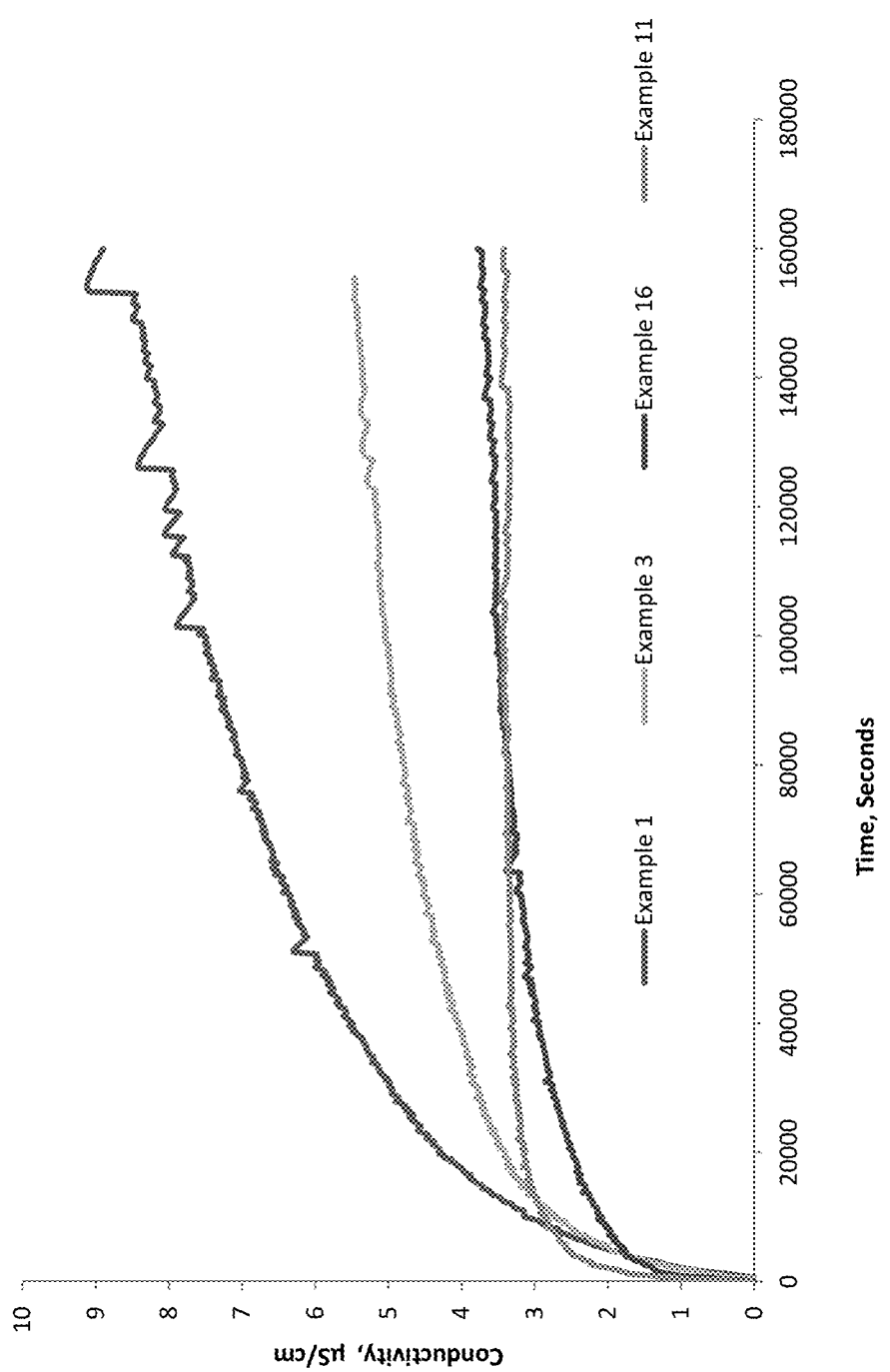
FIG. 1 is a graph illustrating the dissolution profile of Zn-modified alumina supports according to one exemplary embodiment.

In one embodiment, a catalyst support is modified with a first solution containing a compound containing zinc, and optionally containing P, Ti, V, Co, Ga, Ge, Mo, W and/or Pr, in order to minimize the undesirable effects of hydrothermal attack on an FTS catalyst based on the support. The use of the modified catalyst support can reduce the occurrence of ultrafine particles contaminating the waxy hydrocarbon product of the FTS step in a GTL process. The modified catalyst support, also referred to herein as a Fischer-Tropsch catalyst precursor, is prepared according to the following process. Gamma alumina particles are selected as the catalyst support material. In one embodiment, the gamma alumina particles have a diameter from 10 µm to 200 µm. The average size of the particle may be from 60 µm to 100 µm. In one embodiment, the gamma alumina particles have a BET pore volume of at least 0.4 cc/g, even from 0.4 cc/g to 1.0 cc/g.

In one embodiment, the catalyst support is modified with a first solution containing zinc by impregnation. Suitable zinc compounds for use in the first solution include zinc nitrate hexahydrate. The first solution can be aqueous or nonaqueous. The solution can be heated to facilitate dissolution. The solution can then be added to the gamma alumina catalyst support material by any suitable method, e.g., incipient wetness impregnation method. The amount of zinc in the first solution can be from 1 to 10 weight percent. The modified catalyst support material can then be slowly dried, e.g., at a temperature of from 110° to 120° C. to spread the zinc over the entire support. The drying step can be conducted in air.

The modified catalyst support material is then calcined in flowing air at a temperature of at least 500° C. to obtain a modified catalyst support. Calcination should be conducted by using a slow heating rate of, for example, 0.5° to 3° C. per minute or from 0.5° to 1° C. per minute, and the catalyst should be held at the maximum temperature for a period of between 1 and 20 hours.

The modified catalyst support, i.e., the stabilized composite support, has been found to have a pore volume of at least 0.4 cc/g, even from 0.4 cc/g to 0.8 cc/g. The test for hydrothermal stability of the catalyst support is performed using a steaming test. The steaming test includes exposing 1-2 g of modified catalyst support to about 15-30 g of water for 2-20 hours in an autoclave at a temperature of 220-240° C. The modified catalyst support sample is cooled down to room temperature and then dried at 120° C. for 2 hours. Physical analyses are carried out on the modified support alumina support before and after the steam treatment. The modified catalyst support has been found to lose no more than 15% of its pore volume when exposed to water vapor.

The modified catalyst support is then contacted with a second solution that contains a precursor compound of an active cobalt catalyst component to obtain a FTS catalyst precursor. In one embodiment, the modified catalyst support is contacted with the second solution by impregnation, e.g., incipient wetness impregnation.

The impregnated catalyst is then dried. The impregnation using the second solution can be repeated as needed until the desired cobalt loading is achieved. Multiple impregnations are often needed to achieve the desired metal loading, with intervening drying and calcination treatments to disperse and decompose the metal salts. The second solution and support are stirred while evaporating the solvent at a temperature of from about 25° to about 50° C. until "dryness." The impregnated catalyst is slowly dried at a temperature of from about 110° to about 120° C. for a period of about 1 hour so as to spread the metal over the entire support. The drying step may be conducted at a very slow rate in air.

The dried catalyst may then be reduced or it may be calcined first. The dried catalyst is calcined by heating slowly in flowing air, for example 10 cc/gram/minute, to a temperature in the range of from about 200° to about 350° C., for example, from about 250° to about 300° C., that is sufficient to decompose the metal salts and fix the metal. The aforesaid drying and calcination steps can be done separately or can be combined. However, calcination should be conducted by using a slow heating rate of, for example, 0.5° to about 3° C. per minute or from about 0.5° to about 1° C. per minute and the catalyst should be held at the maximum temperature for a period of about 1 to about 20 hours, for example, for about 2 hours.

The foregoing impregnation steps are repeated with additional solutions in order to obtain the desired metal loading, i.e., from 5 wt % to 45 wt % cobalt, even from 20 wt % to 35 wt % cobalt. Metal promoters can be added with the FT component, but they may be added in other impregnation steps, separately or in combination, before, after or between impregnations of FT component. In one embodiment, the catalyst precursor further contains a promoter selected from the group consisting of platinum, ruthenium, silver, palladium, lanthanum, cerium and combinations thereof. The promoter can be added to the second solution or to a subsequent solution, and applied to the modified catalyst support by impregnation. The catalyst precursor can contain the promoter in an amount from 0.01 wt % to 5 wt %.

A Fischer-Tropsch catalyst can then be prepared from the catalyst precursor by reducing the catalyst precursor to activate the catalyst precursor. In one embodiment, the catalyst precursor is placed in a tube reactor in a muffle furnace. The tube can be purged first with nitrogen gas at ambient temperature, after which time the gas feed can be changed to pure hydrogen. The temperature to the reactor can be increased, for example, to 450° C. at a rate of 1° C./minute and then held at that temperature for ten hours. After this time, the gas feed can be switched to nitrogen to purge the system and the unit can be cooled to ambient temperature. Then a gas mixture of 1 volume % $O_2/N_2$ can be passed up through the catalyst bed at 750 sccm for 10 hours to passivate the catalyst.

Advantageously, the Fischer-Tropsch catalyst prepared as described herein loses no more than about 25% of its pore volume when exposed to water vapor. In one embodiment, the catalyst loses not more than 20% its pore volume when the catalyst is contacted with a feed stream at a temperature greater than 200° C. in the presence of water.

In one embodiment, a process of Fischer-Tropsch synthesis is conducted by contacting a gaseous mixture comprising carbon monoxide and hydrogen with the Fischer-Tropsch catalyst prepared as disclosed herein at a pressure of from 0.1 to 3 MPa and a temperature of from 180 to 260° C. The FTS process can occur in a slurry reactor or a continuously stirred tank reactor. The resulting product contains $C_{5+}$ hydrocarbons.

EXAMPLES

Example 1

Comparative

Gamma alumina SA63158 (obtained from Saint-Gobain NorPro Corporation, Stow, Ohio) was used as a catalyst support. This support was used in Example 2 to 6, 9, 11, 16 and 17.

Example 2

1.5% $Zn/Al_2O_3$ modified support was prepared by impregnation of the gamma alumina support using $Zn(NO_3)_2 \cdot 6H_2O$ (obtained from Sigma-Aldrich, St. Louis, Mo.) as the Zn precursor. Water was used as the solvent for the zinc nitrate. The excess solvent was removed in a rotary evaporator under vacuum by heating slowly to 70° C. The vacuum-dried material was then further dried in an oven at 120° C. overnight. Finally, the dried catalyst was calcined at 550° C. for 2 hours in a muffle furnace.

Example 3

3% $Zn/Al_2O_3$ modified support was prepared by impregnation of the gamma alumina support using $Zn(NO_3)_2 \cdot 6H_2O$ as the Zn precursor. Water was used as the solvent for the zinc nitrate. The excess solvent was removed in a rotary evaporator under vacuum by heating slowly to 70° C. The vacuum-dried material was then further dried in an oven at 120° C. overnight. Finally, the dried catalyst was calcined at 550° C. for 2 hours in a muffle furnace.

Example 4

4.5% $Zn/Al_2O_3$ modified support was prepared by impregnation of the gamma alumina support using $Zn(NO_3)_2 \cdot 6H_2O$ as the Zn precursor. Water was used as the solvent for the zinc nitrate. The excess solvent was removed in a rotary evaporator under vacuum by heating slowly to 70° C. The vacuum-dried material was then further dried in an oven at 120° C. overnight. Finally, the dried catalyst was calcined at 550° C. for 2 hours in a muffle furnace.

Example 5

6% $Zn/Al_2O_3$ modified support was prepared by impregnation of the gamma alumina support using $Zn(NO_3)_2.6H_2O$ as the Zn precursor. Water was used as the solvent for the zinc nitrate. The excess solvent was removed in a rotary evaporator under vacuum by heating slowly to 70° C. The vacuum-dried material was then further dried in an oven at 120° C. overnight. Finally, the dried catalyst was calcined at 550° C. for 2 hours in a muffle furnace.

Example 6

7.5% $Zn/Al_2O_3$ modified support was prepared by impregnation of the gamma alumina support using $Zn(NO_3)_2.6H_2O$ as the Zn precursor. Water was used as the solvent for the zinc nitrate. The excess solvent was removed in a rotary evaporator under vacuum by heating slowly to 70° C. The vacuum-dried material was then further dried in an oven at 120° C. overnight. Finally, the dried catalyst was calcined at 550° C. for 2 hours in a muffle furnace.

Example 7

Comparative

Gamma alumina Puralox Scca 5/150 (obtained from Sasol North America Inc, Houston, Tex.) was used as a catalyst support. This support was used in Examples 8, 10, 12-15 and 18.

Example 8

(3% Zn+1.5% Mg)/$Al_2O_3$ modified support was prepared by impregnation of the gamma alumina support using $Zn(NO_3)_2.6H_2O$ and $Mg(NO_3)_2.6H_2O$ (obtained from Sigma-Aldrich) as the respective Zn and Mg precursors. Water was used as the solvent. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Example 9

(3% Zn+1.5% P)/$Al_2O_3$ modified support was prepared by impregnation of the gamma alumina support using $Zn(NO_3)_2.6H_2O$ and $H_3PO_4$ (obtained from Sigma-Aldrich) as the respective Zn and P precursors. Water was used as the solvent. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Example 10

(3% Zn+1.5% Ti)/$Al_2O_3$ modified support was prepared by impregnation of the gamma alumina support using $Zn(NO_3)_2.6H_2O$ and titanium diisopropoxide bis(acetylacetonate) (obtained from Sigma-Aldrich) as the respective Zn and Ti precursors. First, zinc nitrate was dissolved in water. Second, titanium diisopropoxide was dissolved in ethanol. The two solutions were mixed together and then added to gamma alumina. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Example 11

(3% Zn+3% V)/$Al_2O_3$ modified support was prepared by impregnation of the gamma alumina support using $Zn(NO_3)_2.6H_2O$ and vanadium (III) acetylacetonate (obtained from Sigma-Aldrich) as the respective Zn and V precursors. First, zinc nitrate was dissolved in water. Second, vanadium (III) acetylacetonate was dissolved in acetone. The two solutions were mixed together and then added to gamma alumina. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Example 12

(3% Zn+1.5% Cr)/$Al_2O_3$ modified support was prepared by impregnation of the gamma alumina support using $Zn(NO_3)_2.6H_2O$ and $Cr(NO_3)_3.9H_2O$ (obtained from Sigma-Aldrich) as the respective Zn and Cr precursors. Water was used as the solvent. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Example 13

(3% Zn+1.5% Co)/$Al_2O_3$ modified support was prepared by impregnation of the gamma alumina support using $Zn(NO_3)_2.6H_2O$ and $Co(NO_3)_2.6H_2O$ (obtained from Sigma-Aldrich) as the respective Zn and Co precursors. Water was used as the solvent. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Example 14

(3% Zn+1.5% Ga)/$Al_2O_3$ modified support was prepared by impregnation of the gamma alumina support using $Zn(NO_3)_2.6H_2O$ and $Ga(NO_3)_3.xH_2O$ (obtained from Sigma-Aldrich) as the respective Zn and Ga precursors. Water was used as the solvent. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Example 15

(3% Zn+1.5% Ge)/$Al_2O_3$ modified support was prepared by impregnation of the gamma alumina support using Zn(NO$_3$)$_2$.6H$_2$O and Germanium (IV) ethoxide (obtained from Sigma-Aldrich) as the respective Zn and Ge precursors. First, zinc nitrate was dissolved in water. Second, Germanium (IV) ethoxide was dissolved in ethanol. The two solutions were mixed together and then added to gamma alumina. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Example 16

(3% Zn+3% Mo)/Al$_2$O$_3$ modified support was prepared by impregnation of the gamma alumina support using Zn(NO$_3$)$_2$.6H$_2$O and (NH$_4$)$_6$Mo$_7$O$_{24}$.4H$_2$O (obtained from Sigma-Aldrich) as the respective Zn and Mo precursors. Water was used as the solvent. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Example 17

(3% Zn+3% W)/Al$_2$O$_3$ modified support was prepared by impregnation of the gamma alumina support using Zn(NO$_3$)$_2$.6H$_2$O and (NH$_4$)$_6$H$_2$W$_{12}$O$_{40}$.xH$_2$O (obtained from Sigma-Aldrich) as the respective Zn and W precursors. Water was used as the solvent. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Example 18

(3% Zn+1.5% Pr)/Al$_2$O$_3$ modified support was prepared by impregnation of the gamma alumina support using Zn(NO$_3$)$_2$.6H$_2$O and Pr(NO$_3$)$_3$.6H$_2$O (obtained from Sigma-Aldrich) as the respective Zn and Pr precursors. Water was used as the solvent. The excess solvent was removed in a rotary evaporator under vacuum by heating slowly to 70° C. The vacuum-dried material was then further dried in an oven at 120° C. overnight. Finally, the dried catalyst was calcined at 750° C. for 2 hours in a muffle furnace.

Acid Resistance of Supports

Alumina dissolves in an aqueous acid medium. The dissolution of alumina results in the formation of aluminum ions. A method to obtain cumulative aluminum ion dissolution profile was disclosed U.S. Pat. No. 6,875,720 to Van Berge et al., in that concentration of aluminum ions was estimated using conductivity measurements at a constant pH as a function of time. In the present disclosure, the increase of aluminum ions over time was observed by monitoring the conductivity over time using a procedure similar to that disclosed by van Berge et al. For this experiment, 2 g of a support sample was slurried in a dilute nitric acid solution. Then the conductivity was monitored for 30-40 hours. The increase of aluminum ions over time can be monitored by measuring the conductivity of the solution using Metrohm Conductivity Cell with Pt 1000 (C=0.7) over a range of 5-20,000 μS/cm at a constant pH of 2.0 using Metrohm Gel electrode with NTC (using plug head U). The pH was kept constant at pH 2.0 by the automated addition of a 10% nitric acid solution using the 907 Titrando by Metrohm USA (Riverview, Fla.) and Tiamo™ titration software available from Metrohm USA. The conductivity change is due to aluminum dissolution to form Al$^{3+}$.

The conductivity change is plotted as a function time in FIG. 1. The figure clearly indicates that zinc-modified alumina shows much lower conductivity increase than pure gamma alumina at constant acid consumption, demonstrating the present zinc-modified alumina exhibits improved acid resistance.

Hydrothermal Stability of Supports

The hydrothermal stability of the modified and un-modified support was performed in a high pressure Parr reactor. 2 grams of support sample and 15 g of water were charged to autoclave and heated at 220° C. and a pressure of 370 psig for 2 hours. The support sample was cooled down to room temperature and then dried at 120° C. for 2 hours. Two samples (before and after steaming) were then analyzed for change in pore volume. Pore volume of support samples were determined from nitrogen adsorption/desorption isotherms measured at −196° C. using a Tristar analyzer available from Micromeritics Instrument Corporation (Norcross, Ga.). Prior to gas adsorption measurements, the catalyst samples were degassed at 190° C. for 4 hours. Table 1 show the relative percentage change in pore volume of the Examples, calculated by the following formula.

% change=(pore volume before steam test-pore volume after steam test)/(pore volume before steam test)

TABLE 1

| Example Number | Pore Volume, cc/g | | |
|---|---|---|---|
| | Before steaming | After steaming | % Change |
| 1 | 0.574 | 0.110 | 80.8 |
| 2 | 0.553 | 0.477 | 13.7 |
| 3 | 0.541 | 0.491 | 9.2 |
| 4 | 0.523 | 0.483 | 7.6 |
| 5 | 0.521 | 0.491 | 5.8 |
| 6 | 0.498 | 0.478 | 4.0 |
| 7 | 0.486 | 0.175 | 64.0 |
| 8 | 0.443 | 0.402 | 9.3 |
| 9 | 0.500 | 0.483 | 3.4 |
| 10 | 0.451 | 0.418 | 7.3 |
| 11 | 0.501 | 0.478 | 4.6 |
| 12 | 0.446 | 0.397 | 11.0 |
| 13 | 0.447 | 0.409 | 8.6 |
| 14 | 0.449 | 0.414 | 7.8 |
| 15 | 0.447 | 0.415 | 7.1 |
| 16 | 0.513 | 0.490 | 4.5 |
| 17 | 0.521 | 0.494 | 5.2 |
| 18 | 0.449 | 0.422 | 6.1 |

The zinc-based modified alumina support showed better hydrothermal stability than the gamma alumina. The percent pore volume change of the zinc-based modified support did not change as much after the steaming as compared to the unmodified gamma alumina support.

Figure 2:
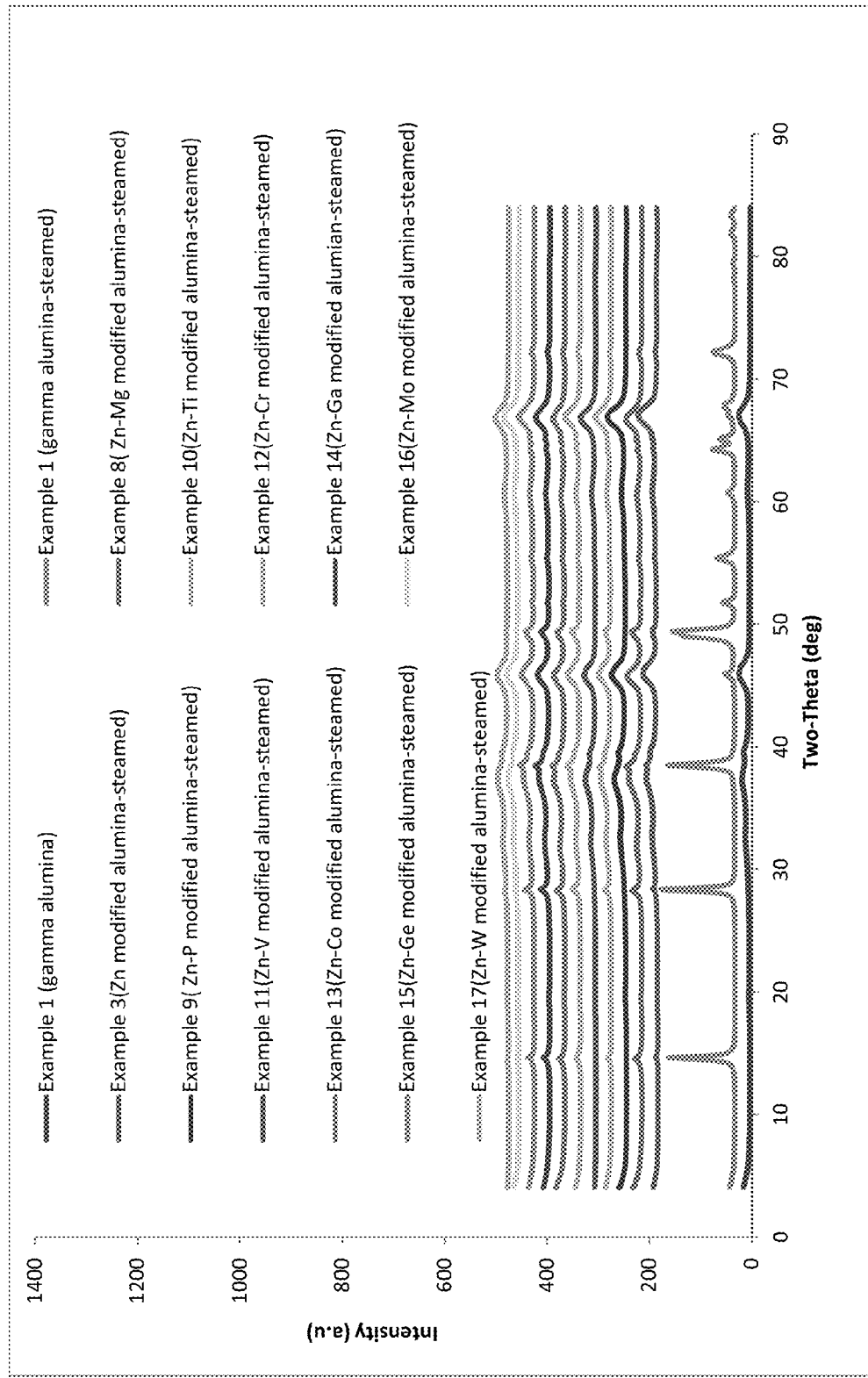
FIG. 2 is a graph illustrating XRD results of catalyst supports before and after steaming according to one exemplary embodiment.

XRD results of the supports before and after steaming are shown in FIG. 2. The comparative XRD results in FIG. 2 show that the unmodified gamma alumina was completely transformed to boehmite after the steam treatment. However, the XRD pattern of zinc-modified alumina after the same steam treatment shows a gamma alumina pattern.

Example 19

Comparative

A three-step incipient wetness impregnation method was used to prepare a Fischer-Tropsch catalyst. A solution was prepared by dissolving cobalt(II) nitrate hexahydrate (obtained from Sigma-Aldrich), tetraammineplatinum(II) nitrate (obtained from Alfa Aesar) and lanthanum (III) nitrate hexahydrate (obtained from Sigma-Aldrich) in water. Alumina from Example 1 was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.05% Pt and 1 wt % $La_2O_3$ and 73.95 wt % alumina.

Example 20

A three-step incipient wetness impregnation method was used to prepare a Fischer-Tropsch catalyst. A solution was prepared by dissolving cobalt(II) nitrate hexahydrate (obtained from Sigma-Aldrich), tetraammineplatinum(II) nitrate (obtained from Alfa Aesar) and lanthanum (III) nitrate hexahydrate (obtained from Sigma-Aldrich) in water. Modified alumina from Example 9 was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.05% Pt and 1 wt % $La_2O_3$ and 73.95 wt % alumina.

Example 21

A three-step incipient wetness impregnation method was used to prepare a Fischer-Tropsch catalyst. A solution was prepared by dissolving cobalt(II) nitrate hexahydrate (obtained from Sigma-Aldrich), tetraammineplatinum(II) nitrate (obtained from Alfa Aesar) and lanthanum (III) nitrate hexahydrate (obtained from Sigma-Aldrich) in water. Modified alumina from Example 11 was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.05% Pt and 1 wt % $La_2O_3$ and 73.95 wt % alumina.

Example 22

A three-step incipient wetness impregnation method was used to prepare a Fischer-Tropsch catalyst. A solution was prepared by dissolving cobalt(II) nitrate hexahydrate (obtained from Sigma-Aldrich), tetraammineplatinum(II) nitrate (obtained from Alfa Aesar) and lanthanum (III) nitrate hexahydrate (obtained from Sigma-Aldrich) in water. Modified alumina from Example 16 was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.05% Pt and 1 wt % $La_2O_3$ and 73.95 wt % alumina.

Example 23

A three-step incipient wetness impregnation method was used to prepare a Fischer-Tropsch catalyst. A solution was prepared by dissolving cobalt(II) nitrate hexahydrate (obtained from Sigma-Aldrich), tetraammineplatinum(II) nitrate (obtained from Alfa Aesar) and lanthanum (III) nitrate hexahydrate (obtained from Sigma-Aldrich) in water. Modified alumina from Example 17 was impregnated by using one-third of this solution to achieve incipient wetness. The prepared catalyst was then dried in air at 120° C. for 16 hours in a box furnace and was subsequently calcined in air by raising its temperature at a heating rate of 1° C./min to 300° C. and holding it at that temperature for 2 hours before cooling it back to ambient temperature. The above procedure was repeated to obtain the following loading of Co, Pt and $La_2O_3$ on the support: 25 wt % Co, 0.05% Pt and 1 wt % $La_2O_3$ and 73.95 wt % alumina.

Hydrothermal Stability of Fischer-Tropsch Catalysts

The hydrothermal stability of the modified and unmodified catalysts was performed in a high pressure Parr reactor. 2 grams of catalyst samples and 30 g of water were charged to an autoclave and heated at 220° C. and a pressure of 390 psig for 20 hours. The catalyst samples were cooled to room temperature and then dried at 120° C. for 2 hours. Each catalyst sample was tested for change in pore volume, before and after steaming. Pore volume of catalyst samples were determined from nitrogen adsorption/desorption isotherms measured at −196° C. using a Tristar analyzer available from Micromeritics Instrument Corporation (Norcross, Ga.). Prior to gas adsorption measurements, the catalyst samples were degassed at 190° C. for 4 hours.

Table 2 shows the relative percentage change in pore volume of the catalyst samples, as calculated by the following formula:

% change=(pore volume before steam test-pore volume after steam test)/(pore volume before steam test)

TABLE 2

| Example Number | Pore Volume, cc/g | | |
|---|---|---|---|
| | Fresh catalyst | Catalyst after steaming | % Change |
| Comparative Example 19 | 0.3121 | 0.2146 | 31.2 |
| Example 20 | 0.2635 | 0.2395 | 9.1 |
| Example 21 | 0.2700 | 0.2199 | 18.55 |
| Example 22 | 0.2723 | 0.2298 | 15.6 |
| Example 23 | 0.2846 | 0.2279 | 19.92 |

It can be seen from Table 2 that the performance of the catalyst on the zinc-modified supports showed enhanced hydrothermal stability compared to the catalyst on the unmodified alumina support with same cobalt loading.

Catalyst Activation

Twenty grams of each catalyst prepared as described above was charged to a glass tube reactor. The reactor was placed in a muffle furnace with upward gas flow. The tube was purged first with nitrogen gas at ambient temperature, after which time the gas feed was changed to pure hydrogen with a flow rate of 750 sccm. The temperature to the reactor was increased to 350° C. at a rate of 1° C./minute and then held at that temperature for ten hours. After this time, the gas feed was switched to nitrogen to purge the system and the unit was then cooled to ambient temperature. Then a gas mixture of 1 volume % $O_2/N_2$ was passed up through the catalyst bed at 750 sccm for 10 hours to passivate the catalyst. No heating was applied, but the oxygen chemisorption and partial oxidation exotherm caused a momentary temperature rise. After 10 hours, the gas feed was changed to pure air, the flow rate was lowered to 200 sccm and held for two hours. Finally, the catalyst was discharged from the glass tube reactor.

A 1 liter CSTR was used for the slurry FTS reaction. The catalyst was transferred to the CSTR unit to mix with 300 g of C-80 Sasol wax (obtained from Sasol North America Corp., Hayward, Calif.). The catalyst was flushed with nitrogen for a period of two hours, after which time the gas feed was switched to pure hydrogen at a flow rate of 500 sccm. The temperature was slowly raised to 120° C. at a temperature interval of 1° C./minute, held there for a period of one hour, then raised to 250° C. at a temperature interval of 1° C./minute and held at that temperature for 10 hours. After this time, the catalyst was cooled to 180° C. while remaining under a flow of pure hydrogen gas.

Fischer-Tropsch Activity

Catalysts prepared and activated as described as above were each subjected to a synthesis run in which the catalyst was contacted with syngas containing hydrogen and carbon monoxide. Experimental conditions and results are given in Table 3.

It can be seen from Table 3 that the performance of the catalyst on the zinc modified supports did not affect the FT performance compared to the unmodified alumina with the same cobalt loading.

What is claimed is:

1. A process for preparing a Fischer Tropsch catalyst precursor, the process comprising:
   a. impregnating a gamma alumina catalyst support material with a first solution comprising zinc nitrate hexahydrate, to obtain a zinc-containing catalyst support material;
   b. calcining the zinc-containing catalyst support material at a temperature of at least 500° C. form a modified catalyst support having a pore volume of at least 0.4 cc/g, wherein the modified catalyst support loses no more than 15% of its pore volume when exposed to water vapor; and
   c. contacting the modified catalyst support with a second solution comprising a precursor compound of an active catalyst component comprising cobalt to obtain a catalyst precursor.

2. The process of claim 1, wherein the first solution comprises from 1 to 10 weight percent zinc.

3. The process of claim 1, wherein the first solution further comprises an element selected from the group consisting of Mg, P, Ti, V, Cr, Co, Ga, Ge, Mo, W and Pr.

4. The process of claim 1, wherein the modified catalyst support is contacted with the precursor compound of an active catalyst component by incipient wetness impregnation of the second solution.

5. The process of claim 1, wherein the modified catalyst support is less soluble in an aqueous acid solution than the gamma alumina catalyst support material.

6. The process of claim 1, wherein the gamma alumina catalyst support material is in the form of particles having a size from 10 μm to 200 μm.

7. The process of claim 1, wherein the gamma alumina catalyst support material is in the form of particles having an average particle size from 60 μm to 100 μm.

8. The process of claim 1, wherein the gamma alumina catalyst support material comprises gamma alumina having a BET pore volume from 0.4 cc/g to 1.0 cc/g.

9. The process of claim 1, wherein the stabilized composite support formed has a pore volume of from 0.4 cc/g to 0.8 cc/g.

TABLE 3

| Run Conditions | Example 19 (Comparative) | Example 20 | Example 21 | Example 22 | Example 23 |
|---|---|---|---|---|---|
| Temperature,° C. | 220 | 220 | 220 | 220 | 220 |
| Pressure, psig | 280 | 280 | 280 | 280 | 280 |
| Space Velocity, cc/g/h | 6000 | 6000 | 6000 | 6000 | 6000 |
| $H_2$/CO ratio | 2 | 2 | 2.0 | 2.0 | 2.0 |
| Results | | | | | |
| CO Conversion, (mol %) | 41.3 | 47.3 | 44.7 | 40.4 | 46.7 |
| $C_{5+}$ Productivity, g/g/h | 0.391 | 0.456 | 0.433 | 0.359 | 0.457 |
| Selectivity, mol % | | | | | |
| $CH_4$ | 6.7 | 7.1 | 6.3 | 8.2 | 6.0 |
| $C_2$ | 1.1 | 0.9 | 0.9 | 1.7 | 0.8 |
| $C_3$ | 3.4 | 2.8 | 2.9 | 4.5 | 3.2 |
| $C_4$ | 3.6 | 3.1 | 3.1 | 4.3 | 2.1 |
| $C_5+$ | 84.3 | 85.6 | 86.1 | 79.0 | 87.0 |
| $CO_2$ | 0.9 | 0.5 | 0.7 | 2.3 | 0.9 |

10. The process of claim 1, wherein the catalyst precursor obtained comprises from 5 wt % to 45 wt % of the active catalyst component.

11. The process of claim 1, wherein the catalyst precursor obtained comprises from 20 wt % to 35 wt % of the active catalyst component.

12. The process of claim 1, wherein the catalyst precursor comprises a promoter selected from the group consisting of platinum, ruthenium, silver, palladium, lanthanum, cerium and combinations thereof.

13. The process of claim 12, wherein the catalyst precursor comprises the promoter in an amount from 0.01 wt % to 5 wt %.

14. A process for preparing a Fischer Tropsch catalyst, the process comprising:
   a. preparing a catalyst precursor according to claim 1; and
   b. reducing the catalyst precursor to activate the catalyst precursor to obtain the Fischer Tropsch catalyst.

* * * * *